Patented Nov. 3, 1936

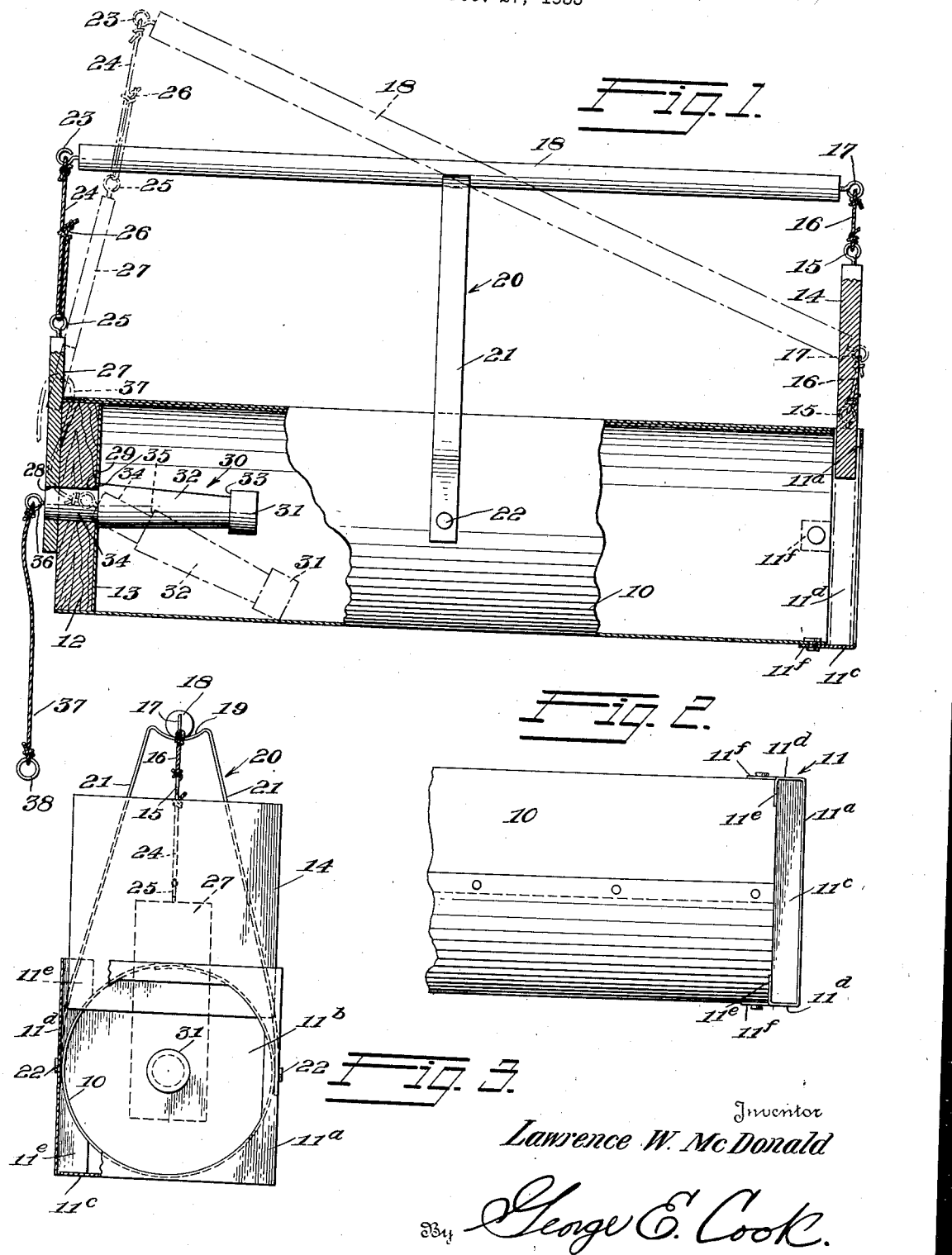

2,059,954

UNITED STATES PATENT OFFICE 2,059,954

ANIMAL TRAP

Lawrence W. McDonald, Russellville, Ark.

Application December 27, 1935, Serial No. 56,368

8 Claims. (Cl. 43—61)

The present invention relates to animal traps.

A primary object of the present invention is the provision of an animal trap which is effective in operation and which can be set with a minimum of effort and in a minimum of time.

A further object of the invention is the provision of an animal trap having an elongated cylindrical body which more nearly resembles objects in the animal's normal habitat and thus arousing less suspicion on the part of the animals desired to be caught.

A still further object of the invention is the provision of an animal trap which is simple in construction and which can be manufactured at relatively low cost.

With these objects in view as well as others that may become apparent during the course of the following disclosure, reference will be had to the accompanying drawing forming part of same, and wherein—

Figure 1 is a view in side elevation and longitudinal section of the trap forming the subject matter of the present application, the view illustrating the trap set in full lines and sprung in dot and dash lines.

Figure 2 is a top plan view of the right hand end of the trap illustrated in Figure 1 with the door omitted, and Figure 3 is a front elevation partly in section of the trap illustrated in Figure 1.

Referring to the drawing by reference characters and in which like characters designate like parts in the different views, 10 designates the body of the trap which in accordance with the present invention is of cylindrical form and is preferably constructed of relatively light gauge sheet metal. The body 10 is provided at the front or door end thereof with a combined support and door guide 11 which is preferably formed from a rectangular sheet of sheet metal and comprises a rectangular front portion 11ª, having an opening 11ᵇ which opening at the bottom and at the upper corners thereof is of arcuate formation in conformity with the cylindrical body 10 as is clearly illustrated in Figure 3.

The combined support and door guide 11 further comprises a bottom horizontal flange 11ᶜ, and opposite side vertical flanges 11ᵈ, the flanges 11ᶜ and 11ᵈ being integral with the front portion 11ª and disposed at right angles thereto and the member 11 further comprises vertical flanges 11ᵉ which are integral with flanges 11ᵈ and which are spaced from the front portion 11ª to provide a vertically disposed door guide as is clearly indicated in Figure 2. The flanges 11ᶜ and 11ᵈ are each provided with an integral tongue 11ᶠ each of which is riveted or otherwise secured to the adjacent end of the body 10 as is clearly illustrated in the drawing.

The opposite end of the body 10 is closed by means of a disc member 12 which, for the sake of cheapness in construction and to facilitate attachment thereof to the body 10 as by nails is preferably constructed of wood. Suitably secured to the inner face of member 12 as by nailing thereto is a sheet metal disc 13 which prevents possible gnawing of the wooden member 12 by an entrapped animal.

Slidably disposed within the door guide 11 is a rectangular door 14 which is preferably constructed of metal in order to be immune to gnawing by entrapped animals and in order to have sufficient weight to assure quick and positive dropping thereof when released, by the mechanism hereinafter prescribed.

The door 14 is provided centrally of the upper edge thereof with an eye or equivalent means 15 to which is secured one end of a flexible element 16, the opposite end of which is secured to an eye 17 carried by the adjacent end of a rod 18.

The rod 18 is loosely supported substantially centrally of the length thereof in the concaved portion 19 of a sheet metal strap 20. The strap 20 comprises in addition to the concave rod supporting portion 19 oppositely disposed downwardly diverging arms 21, the lower ends of which are pivotally secured as by riveting or other suitable means to the body 10 as indicated at 22. The arms 21 are preferably secured to the body 10 at diametrically opposite points thereof as is clearly indicated in Figures 1 and 3 and the arms are so secured as to provide substantial frictional engagement thereof with the adjacent sides of body 10 whereby the support 20 will normally remain in vertical or operative position but is capable of being swung about the pivotal connections 22 into substantially horizontal alignment with the body 10 to facilitate packing and transporting of the trap.

The opposite end of the rod 18 is provided with an eye or similar means 23 to which is secured one end of a flexible element 24. The opposite end of the element 24 is extended through an eye 25 and is secured to the body of the flexible element by means of a slip knot 26.

The eye 25 is supported centrally in the upper edge of a trigger release member 27 which member is of rectangular form and is provided with a hole 28 adjacent the lower end thereof for registry with a hole 29 in the member 12.

As is illustrated in Figure 1 the trigger release member 27 rests flatly against the outer face of member 12 with holes 28 and 29 in registry when the trap is set and the flexible element 24 is so adjusted by means of the slip knot 26 that the door 14 will be in sufficiently elevated position to admit an animal for which the trap is set.

In order to hold the member 27 in the position indicated in full lines in Figure 1 and to effect release thereof as indicated in dot and dash lines in the same figure a novel form of trigger 30 is provided.

This trigger is a symmetrical elongated member and comprises a cylindrical head 31, and a bait receiving frusto-conical portion 32, the smaller end of which is adjacent the head 31 and provides therewith a shoulder 33 to preclude disengagement of the bait. The trigger further comprises a reduced cylindrical portion 34 of substantially the same diameter as holes 28 and 29 and which cylindrical portion forms with the larger end of the frusto-conical portion 32 a shoulder 35 adapted for engagement with disc 13 with the cylindrical portion 34 disposed in the holes 28 and 29 in the set position of the trap and is clearly illustrated in Figure 1.

The end of the cylindrical portion 34 is provided with an eye 36 to which is secured one end of a flexible element 37, the opposite end of which is provided with a suitable catch ring 38.

In Figure 1 the trap is illustrated in full lines in set position and from which it will be noted that the relative arrangement of parts is such that the rod 18 rests substantially centrally thereof on the support 20 and is substantially parallel with the body 10, and that the flexible elements 16 and 24 are vertically disposed with the lower portion of the door resting in the guide 11 and with the trigger release member 27 resting against the closed end of the body 10 with the cylindrical portion 34 of the trigger 30 resting in the hole 28 therein and with the axis of the trigger 30 substantially normal to the trigger release member 27 to effect a positive set in the trap as well as effecting ready springing of the trap upon inward axial movement of the trigger 30 through pull on the bait secured to the trigger.

The frusto-conical portion 32 of the trigger 30 with the shoulder 33 provides an effective bait holding surface to assure inward axial movement of the trigger through pull on the bait by an animal, and as the weight of the door effects an upward pull through the member 27 at right angles to the axis of the portion 34 of the trigger 30 the trap will not accidentally become sprung and yet the engagement between the portion 34 and the member 27 provides for easy and positive release of the member 27 upon a relatively light inward pull on the trigger thus permitting the door 14 to drop and close the opening 11ᵇ into the body to entrap the animal.

When the trap has been sprung the parts will be substantially in the position indicated in dot and dash lines in Figure 1, i. e. the door 14 will be closed, the trigger release member 27 will be raised and the trigger 30 will be in the position indicated or may rest entirely on the bottom of the body 10.

It will be noted upon inspection of Figure 1 that the flexible element 37 is of sufficient length that when the trap has been sprung it will extend through the holes 29 and 28 in the members 12 and 27 respectively with the free end thereof or the catch ring 38 readily accessible to the trapper. This element greatly facilitates resetting of the trap for the reason that upon outward pulling thereon the trigger 30 is brought into alignment with the holes 29 and 28 thus avoiding the otherwise necessity of positioning the trigger from within the body 10.

The body 10 being of elongated cylindrical form more nearly resembles objects in the animal's normal habitat and thus will arouse less suspicion than those of the common box form. Furthermore the cylindrical form is less expensive as it can readily be constructed from light gauge sheet metal and yet possess sufficient strength. In fact the body 10 of the present invention can well be constructed from a suitable length of stove pipe and the diameter of the body as well as the length thereof will depend upon the particular animals to be trapped.

The relatively simple and inexpensive sheet metal door guide and support due to its rectangular form supports the body 10 against rolling as well as providing an efficient vertical guide for the door.

The members 18, 27, and 30 are preferably constructed of wood for the sake of lightness as well as cheapness in construction and while the door 14 is preferably of metal it may if desired be constructed of wood and lined with sheet metal similar to the closed end construction for the body.

From the foregoing disclosure it will be seen that an animal trap is provided which is simple in construction, can be manufactured at relatively low cost, is effective in operation and can be easily transported and set in a minimum amount of time and with a minimum amount of effort.

While I have disclosed but a single specific embodiment of my invention, the same is to be considered as illustrative and not restrictive, the scope of the invention being defined in the subjoined claims.

What I claim and desire to secure by U. S. Letters Patent is:—

1. An animal trap comprising a cylindrical body member, a rectangular member secured to one end of the body member for supporting same in fixed position, flanges on the rectangular member providing a vertically disposed door guide, a door slidably disposed in the guide, a support pivotally connected to the body member intermediate the ends thereof, a rod engaging the support, a trigger release member disposed adjacent the opposite end of the body member, a trigger for cooperation with the trigger release member, and flexible connections between the door and trigger release member and the opposite ends of the rod.

2. The construction defined in claim 1 wherein an adjustment is provided in one of said flexible connections to adjust the height of the door in the set position of the trap.

3. An animal trap comprising a cylindrical body member having an open end and a closed end, a vertically slidable door cooperating with the open end of the body member, an axially disposed aperture in the closed end of the body member, a trigger release member provided with an aperture for alignment with the first mentioned aperture, operative connections between the door and the trigger release member, and a trigger comprising an elongated member having a cylindrical portion for engagement within the aligned apertures for holding the trigger release member against movement in the set position of the trap and for disengagement with the aperture in the trigger release member for springing the trap upon axial movement of the trigger relative to the body member.

4. The construction defined in claim 3 wherein said trigger comprises in addition to said cylindrical portion, a frusto-conical bait receiving portion, and a head for confining the bait on said bait receiving portion.

5. The construction defined in claim 3 wherein one end of a flexible element is secured to said trigger with the opposite end thereof disposed exteriorly of the body member in both the set and sprung positions of the trap.

6. An animal trap comprising a body member having an open end and a closed end, a horizontally disposed aperture in the closed end, a trigger comprising a frusto-conical bait receiving portion, a head defining a bait confining shoulder at one end of the frusto-conical portion, and a reduced cylindrical portion at the opposite end of the frusto-conical portion for axial movement in said aperture, a trigger release member having an aperture for receiving said cylindrical portion, a door for controlling the open end of the body member, and operative connections between the trigger release member and the door.

7. An animal trap comprising a body member having an open end and a closed end, a door supported by the open end of the body member, a trigger release member disposed adjacent to the closed end of the body member, a support pivotally connected to the body member, a rod loosely engaged with the support, connections between the door and trigger release member and the respective opposite ends of the rod, and a trigger movably supported by the closed end of the body member for cooperation with the trigger release member.

8. An animal trap comprising an elongated cylindrical body member, a rectangular body member support and door guide secured to one end of the body member, a door movably supported by the body member support and door guide, a trigger movably supported by the opposite end of the body member, and operative connection between the door and trigger.

LAWRENCE W. McDONALD.